US011669517B2

(12) United States Patent
Llorca et al.

(10) Patent No.: US 11,669,517 B2
(45) Date of Patent: *Jun. 6, 2023

(54) INTERACTIVE INTERPRETER AND GRAPHICAL USER INTERFACE

(71) Applicant: Palantir Technologies Inc., Denver, CO (US)

(72) Inventors: Antoine Llorca, San Francisco, CA (US); Gregory O'Connor, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/116,174

(22) Filed: Dec. 9, 2020

(65) Prior Publication Data

US 2021/0089519 A1 Mar. 25, 2021

Related U.S. Application Data

(63) Continuation of application No. 15/969,648, filed on May 2, 2018, now Pat. No. 10,885,021.

(51) Int. Cl.
*G06F 16/23* (2019.01)
*G06F 3/0484* (2022.01)
(Continued)

(52) U.S. Cl.
CPC ........ *G06F 16/2379* (2019.01); *G06F 3/0484* (2013.01); *G06F 16/248* (2019.01); *G06F 16/252* (2019.01)

(58) Field of Classification Search
CPC .. G06F 16/2379; G06F 16/248; G06F 16/252; G06F 3/0484
(Continued)

(56) References Cited

U.S. PATENT DOCUMENTS 10,885,021 B1 1/2021 Llorca et al.
2011/0055250 A1* 3/2011 Nandy .................. G06F 16/248
715/810

(Continued)

*Primary Examiner* — Kuen S Lu
(74) *Attorney, Agent, or Firm* — Knobbe Martens Olson & Bear LLP

(57) ABSTRACT

A text-based interactive interpreter and user interface that sequentially allows a user to modify, transform, or filter data sets from a database system. Execution of user generated instructions results in output that can be rendered as a table, map, JSON, or other view. A user can easily retrieve a data set from a resource identifier for the data set. Instructions and results are presented in a sequential manner down the user interface page. Instructions can refer to variables and output data from previous blocks in the user interface page. The interpreted user-generated textual instruction areas can retrieve a data set specified in the textual blocks, parse and execute the textual instructions to transform, filter, or manipulate the data set. The resulting data set is rendered according to the data type, default settings, or preconfigured preferences into a table, map, JSON, or other view. Each or a subset of the textual instruction blocks can be persisted, versioned, and permissioned according to access control lists. The particular session of textual instruction blocks and transformations can be published as a service, which, if called again, can dynamically perform the user generated instructions and output the result data.

18 Claims, 10 Drawing Sheets

(51) Int. Cl.
*G06F 16/248* (2019.01)
*G06F 16/25* (2019.01)
*G06F 9/455* (2018.01)

(58) Field of Classification Search
USPC .......................................................... 715/769
See application file for complete search history.

(56) References Cited

U.S. PATENT DOCUMENTS

| | | | |
|---|---|---|---|
| 2015/0088920 A1* | 3/2015 | Johnston | G06F 16/739 |
| | | | 707/766 |
| 2015/0106858 A1* | 4/2015 | Moran | H04M 3/567 |
| | | | 725/61 |
| 2015/0178007 A1* | 6/2015 | Moisa | H04L 67/06 |
| | | | 713/190 |
| 2016/0035005 A1* | 2/2016 | Kumar | G06Q 30/0633 |
| | | | 705/26.8 |
| 2017/0147639 A1* | 5/2017 | Lee | G06F 16/24539 |
| 2019/0050445 A1* | 2/2019 | Griffith | G06F 16/213 |
| 2019/0095491 A1* | 3/2019 | Bhattacharjee | G06F 16/13 |
| 2019/0180040 A1* | 6/2019 | Marcel | G06F 21/6218 |

* cited by examiner

```
$1  1  failures= database("ri.database.main.dataset.datasetreferencenumber")
    2
```

| failure_id | product_number | part_id | date |
|---|---|---|---|
| "1" | "2" | "25" | "1474790034" |
| "2" | "5" | "14" | "1477014200" |
| "3" | "4" | "2" | "1484420204" |
| "4" | "9" | "8" | "1473993960" |
| "5" | "6" | "23" | "1487694214" |

```
$2  1  // 2 weeks duration
    2  two_weeks_ago = new Date() - 1000 * 24 * 14 * 3600
    3  // get all failures from last 2 weeks
    4  failures_from_last_two_weeks = failures
    5    .map(row => JSON.parse(JSON.stringify(row)))
    6    .map(row => _.assign({}, row, { date: new Date(row.date *1000) } ) )
    7    .filter(failure => failure.date > two_weeks_ago)
    8
```

| failure_id | product_number | part_id | date |
|---|---|---|---|
| "27" | "2" | "7" | "2017-07-27T08:40:05..." |
| "39" | "2" | "21" | "2017-07-29T10:34:40..." |
| "44" | "8" | "9" | "2017-07-29T02:46:29..." |
| "107" | "6" | "10" | "2017-08-03T04:05:06..." |
| "123" | "2" | "5" | "2017-07-03T14:33:46..." |

```
$3  1  // get the product parts dataset
    2  database("ri.database.main.dataset.datasetreferencenumber2")
    3  // part information can be encoded in JSON
    4    .map(part => _.assign({}, { part_id:part.part_id ,JSON.parse(part.part_
       information_json)))
    5
    6
```

| part_id | name | manufactured_date |
|---|---|---|
| "1" | "Door" | "1445016330" |
| "2" | "Roof" | "1445444886" |
| "3" | "Pump" | "1441623639" |
| "4" | "Sensor" | "1467494435" |
| "5" | "Exhaust Pipe" | "1467956924" |

FIG. 1

$4
```
1  // create a map from part_id to part
2  _.keyBy($3, (part) => part.part_id)
3
```

{"1":{"part_id":"1","name":"Roof","manufactured_date":"1445444886"},
"2":{"part_id":"2","name":"Pump","manufactured_date":"1445016330"},"3":{"part_id":
"3","name":"Pump","manufactured_date":"1441623639"},"4":{"part_id":
"4","name":"sensor","manufactured_date":"1467494435"},"5":{"part_id":"5",
"name":"Exhaust Pipe","manufactured_date":"1467956924"}}

$5
```
1  // map from part_id to number of times that part failed
2  failure_frequency = _.countBy(failures_from_last_two_weeks,(failure)=>
3  failure.part_id)
4
```

{"3":2, "5":2, "7":3, "8":1, "9":2, "10":1, "12":2, "13":2, "15":1, "16":1,"19":1,"21":1}

$6
```
1  // parts with failure count
2  parts_with_failure_count = _.keys(failure_frequency).map (key) => _.assign
3  ( { }, _$4[key] ,{count: failure_frequency [key] } ) )
4
```

| part_id | name | manufactured_date | count |
|---|---|---|---|
| 1 | "3" | "Pump" | "1441623639" | 2 |
| 2 | "5" | "Exhaust Pipe" | "1467956924" | 2 |
| 3 | "7" | "Axel Beam" | "1456990853" | 3 |
| 4 | "8" | "Rotor" | "1461624896" | 1 |
| 5 | "9" | "Wheel" | "1449265583" | 2 |

FIG. 2A $4
```
1  // create a map from part_id to part
2  _.keyBy($3, (part) => part.part_id)
3
```

{"1":{"part_id":"1", "name":"pump", "manufactured_date":"1445016330"}, "2":{"part_id":"2", "name":"Roof", "manufactured_date":"1445444886"}, "3":{"part_id":"3", "name":"pump", "manufactured_date":"1441623639"}, "4":{"part_id":"4", "name":"sensor", "manufactured_date":"1467494435"}, "5":{"part_id":"5", "name":"Exhaust Pipe", "manufactured_date":"1467956924"}}

$5
```
1  // map from part_id to number of times that part failed
2  failure_frequency = _.countBy(failures_from_last_two_weeks, (failure) => failure.part_id)
3
```

{"3":2, "5":2, "7":3, "8":1, "9":2, "10":1, "12":2, "13":2, "15":1, "16":1, "19":1, "21":1}

$6
```
1  // parts with failure count
2  parts_with_failure_count = _.keys(failure_frequency).map(key) => _.assaign({},
3      $4[key], {count: failure_frequency[key]})
4  // get the 5 parts which failed the most frequently in the last 2 weeks
5  _.chain(parts_with_failure_count)
6      .sortBy((part) => -part.count)
7      .take(5)
8
```

| part_id | name | manufactured_date | count |
|---|---|---|---|
| 1 | "7" | "Cockpit Door" | "1456990853" | 3 |
| 2 | "3" | "A/C Pump" | "1441623639" | 2 |
| 3 | "5" | "Humidity Sensor" | "1467956924" | 2 |
| 4 | "9" | "Seatbelt" | "1449265583" | 2 |
| 5 | "12" | "Wheel Motor" | "1461380847" | 2 |

FIG. 2B

FIG. 2C $4  150  116D
```
1  // create a map from part_id to part
2  _.keyBy($3, (part) => part.part_id)
3
```

152
```
[{"1":{"part_id":"1","name":"Roof","manufactured_date":"1445016330"},"2":{"part_id":"2","name":"pump","manufactured_date":"1454444886"},"3":{"part_id":"3","name":"pump","manufactured_date":"1441623639"},"4":{"part_id":"4","name":"sensor","manufactured_date":"1467494435"},"5":{"part_id":"5","name":"Exhaust Pipe","manufactured_date":"1467956924"}}]
```

$5  116E  154
```
1  // map from part_id to number of times that part failed
2  failure_frequency = _.countBy(failures_from_last_two_weeks, (failure) => failure.part_id)
3
```

155
```
{"3":2,"5":2,"7":3,"8":1,"9":2,"10":1,"12":2,"13":2,"15":1,"16":1,"19":1,"21":1}
```

$6  116F
```
1  // parts with failure count
2  parts_with_failure_count = _.keys(failure_frequency).map((key) => _.assign({},
3  $4[key], { count: failure_frequency[key] }))
4  // get the 5 parts which failed the most frequently in the last 2 weeks
5  _.chain(parts_with_failure_count)
6    .sortBy((part) => -part.count)
7    .take(5)
8
```

159

| part_id | name | manufactured_date | count |
|---|---|---|---|
| 1 | "7" | "Cockpit Door" | "1456990853" | 3 |
| 2 | "3" | "A/C Pump" | "1441623639" | 2 |
| 3 | "5" | "Humidity Sensor" | "1467956924" | 2 |
| 4 | "9" | "Seatbelt" | "1449265583" | 2 |
| 5 | "12" | "Wheel Motor" | "1461380847" | 2 |

161

162 → Endpoint https://localhost:8080/projectname/api/run 164
curl   TypeScript
curl   'https://localhost:8080/projectname/api/run' -H 'authorization: fKP1U9KnahTNdjm048qmzM0kMWczTKQskU.h_asK3jdwhn0SJ13kB31uG'

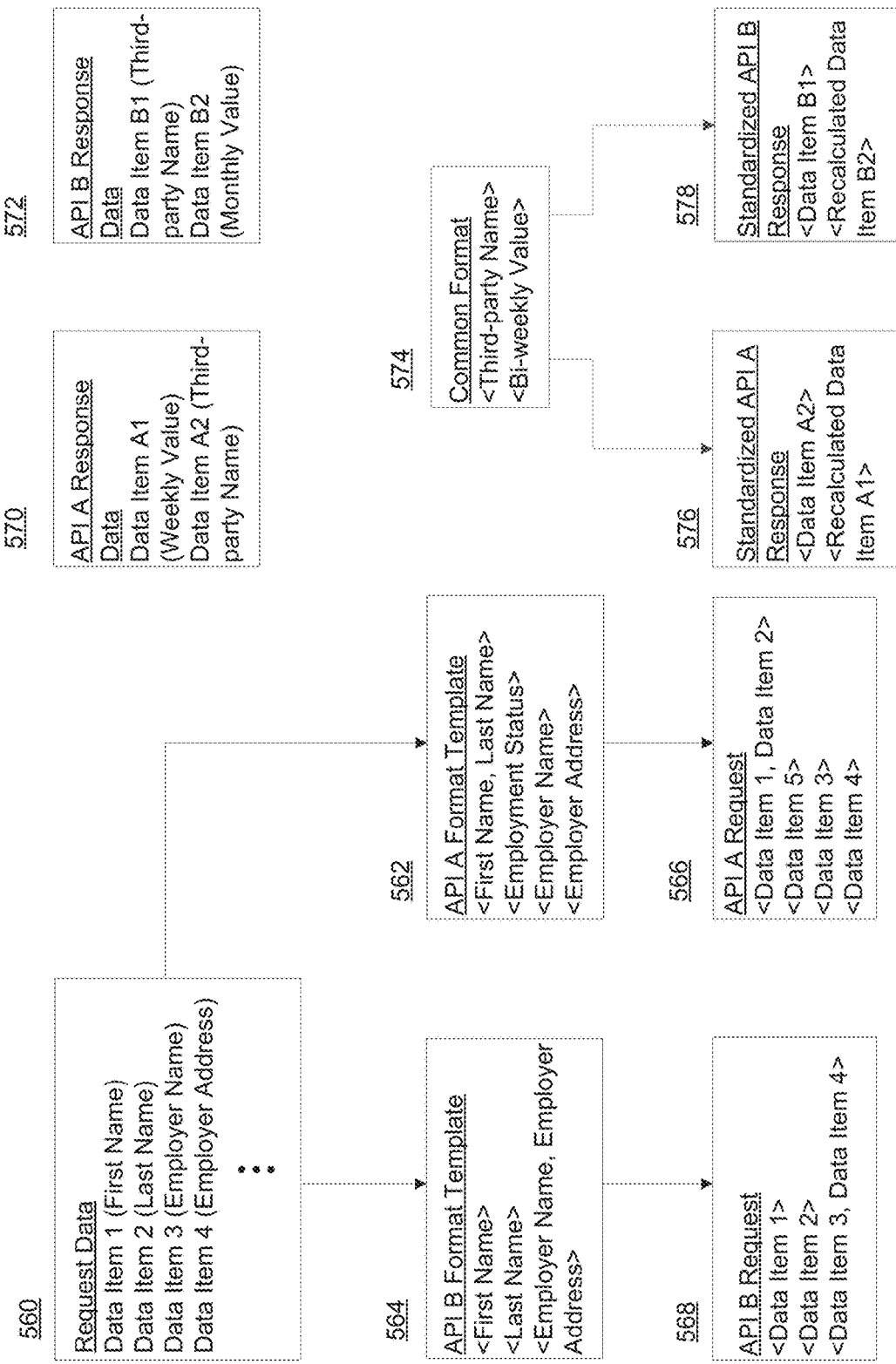

INTERACTIVE INTERPRETER AND GRAPHICAL USER INTERFACE

CROSS-REFERENCE TO RELATED APPLICATION

This application is a continuation of U.S. patent application Ser. No. 15/969,648, filed May 2, 2018, entitled "INTERACTIVE INTERPRETER AND GRAPHICAL USER INTERFACE," the contents of which are hereby incorporated by reference in its entirety.

TECHNICAL FIELD

The present disclosure relates to systems and techniques for data integration, analysis, and visualization. More specifically, the present disclosure relates to a text-based interactive interpreter and user interface that sequentially allows a user to modify, transform, or filter data sets from a data pipeline.

BACKGROUND

In a data pipeline system, it can be difficult for users to make API requests to get data from the data pipeline system. For example, a user may be interested in building an application that uses the data or is interested in conducting an investigation using the data. The API requests can be complex and requires the user to have a lot of knowledge about the services to properly request the data. It would be beneficial if users had a way to easily request data from the data pipeline system and to be able to use and/or explore the data in a quick and easy manner. Further, the results of the user's investigation should be shareable with other users, applications, or services.

SUMMARY

The systems, methods, and devices described herein each have several aspects, no single one of which is solely responsible for its desirable attributes. Without limiting the scope of this disclosure, several non-limiting features will now be discussed briefly.

In some embodiments, the systems and methods described can include a text-based interactive interpreter and user interface that sequentially allows a user to modify, transform, or filter data sets from a data pipeline. A user can enter text-based instructions where the output can be rendered as a table, map, JSON, or other view. A user can easily retrieve a data set from a resource identifier for the data set. First, second, third, etc. instructions and results are presented in a sequential manner down the user interface page. The second, third, etc. instructions can refer to variables and output data from previous blocks in the user interface page. The interpreted user-generated textual instruction blocks retrieve the data set specified in the textual blocks, parses and executes the user's textual instructions to transform, filter, or manipulate the data set. The resulting data set is rendered according to the data type into a table, map, JSON, or other view. Each or a subset of the textual instruction blocks can be persisted, versioned, and permissioned according to access control lists. The particular session of textual instruction blocks and transformations can be published as a service, which, if called again, can dynamically perform the user generated instructions and output the result data.

The described systems and methods for creating custom code and converting to API or service information to be used later can provide a simplified process that can be performed with less technical expertise and in less time. The benefit of clicking one button to generate an API or service makes the whole process easier and requires little to no prior experience with services to generate or service functions.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an interactive, optimized display of data and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, the systems and methods described can comprise: a data pipeline system, wherein the data pipeline system is configured to perform data transformations to generate a plurality of data sets; a first non-transitory computer storage medium configured to at least store persisted user generated computer-executable instructions; a second non-transitory computer storage medium configured to at least store computer-executable instructions; and one or more computer hardware processors in communication with the second non-transitory computer storage medium, the one or more computer hardware processors configured to execute the computer-executable instructions to at least: cause presentation of a graphical user interface configured to receive user generated computer-executable instructions; receive, from the graphical user interface, first user generated computer-executable instructions comprising a resource identifier; in response to receiving the first user generated computer-executable instructions, retrieve, from the data pipeline system, a data set from the plurality of data sets associated with the resource identifier; receive, from the graphical user interface, second user generated computer-executable instructions; in response to receiving the second user generated computer-executable instructions, apply the second user generated computer-executable instructions, wherein applying the second user generated computer-executable instructions further comprises: determining, based on automated analysis of the second user generated computer-executable instructions, an operation; performing the determined operation on the data set; and generating output from the operation, wherein the output is different from the data set; causing presentation, in the graphical user interface, of the output; and storing, in the first non-transitory computer storage medium, the first user generated computer-executable instructions and the second user generated computer-executable instructions.

In some embodiments, the systems and methods described can also comprise: receive, from the graphical user interface, third user generated computer-executable instructions; and in response to receiving the third user generated computer-executable instructions, apply the third user generated computer-executable instructions, wherein applying the third user generated computer-executable instructions further comprises: publishing the second user generated computer-executable instructions as a service.

In some embodiments, the systems and methods described can also comprise: execute the service to dynamically retrieve and process data. Also, in some embodiments, the systems and methods described can also comprise: assign, a reference variable to the output from the operation based on the second user generated computer-executable instructions; receive fourth user generated computer-executable instructions comprising the reference variable; and in response to receiving the fourth user generated computer-executable instructions, apply the fourth user generated computer-executable instructions, wherein applying the fourth user generated computer-executable instructions further comprises: determining, based at least on the fourth user generated computer-executable instructions, a second operation; performing the second operation on the output identified by the reference variable; and generating second output from the second operation, wherein the second output is different from the output; and causing presentation, in the graphical user interface, of the second output.

In some embodiments, wherein executing the service to dynamically retrieve and process data further comprises: retrieving, from the first non-transitory computer storage medium, at least one of the first user generated computer-executable instructions or the second user generated computer-executable instructions; and applying at least one of the first user generated computer-executable instructions or the second user generated computer-executable instructions a second time.

Further, in some embodiments, the systems and methods described can also include: the first user generated computer-executable instructions is stored as a first block and the second user generated computer-executable instructions is stored as a second block, at least one of the first user generated computer-executable instructions or the second user generated computer-executable instructions are accessible by a plurality of users, and/or at least one of the first user generated computer-executable instructions or the second user generated computer-executable instructions are accessible to one or more users based at least in part on preconfigured user access restrictions.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 1 illustrates an example graphical user interface of an interactive interpreter system, according to various embodiments of the present disclosure.

FIGS. 2A-2C illustrate the example graphical user interface of the interactive interpreter system from FIG. 1, showing further interactions and capabilities of the system, according to various embodiments of the present disclosure.

FIG. 5B is a schematic illustration of example database structures of the database system, according to various embodiments of the present disclosure.

FIG. 5C is an illustration of example API request data generation, according to various embodiments of the present disclosure.

DETAILED DESCRIPTION

Overview

Figure 3:
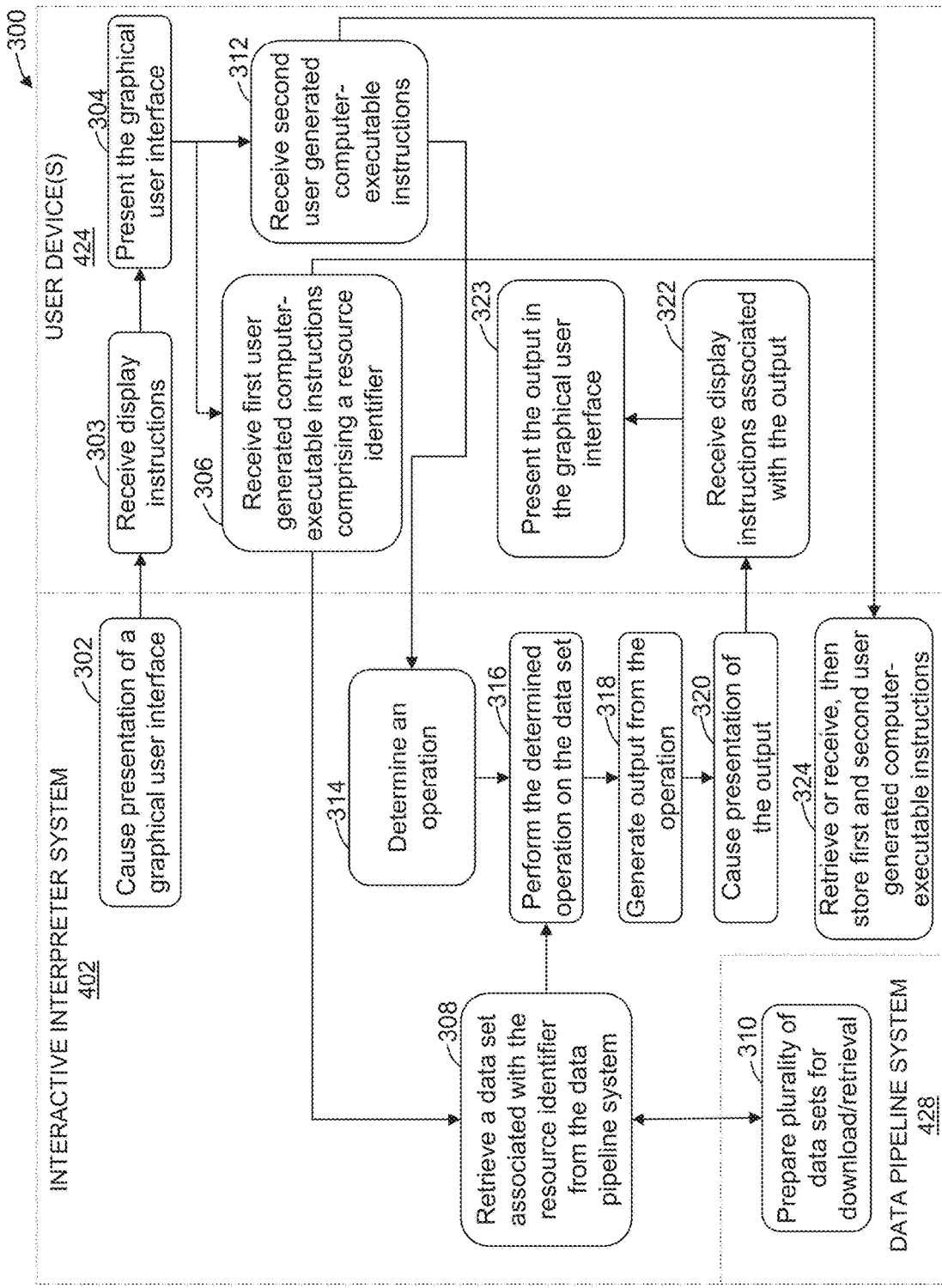
FIG. 3 illustrates a flow chart diagram illustrating functionality of the interactive interpreter system related to various inputs and outputs of the system, according to various embodiments of the present disclosure.

In database systems, analysts interact with and manipulate data. However, in some of these existing systems, simply accessing the data can be a time-consuming process. For example, the data may be stored in a myriad of different locations and/or may require knowledge of various complicated Application Programming Interfaces (APIs). Accordingly, a large and technically complex database system may present a barrier for analysts to analyze, investigate, and manipulate data.

The systems and methods described herein may advantageously provide a simplified application or tool to enable the users to retrieve and interact with data from a database system, such as a database pipeline system. In some embodiments, the systems and methods described herein may advantageously provide a text-based interactive interpreter and user interface that sequentially allows a user to modify, transform, or filter data sets from the database system. Moreover, those interactions and/or customized logic prepared by a user can be shared with other users. In some embodiments, users can prepare instructions in an interactive manner with a programming language (e.g., JavaScript, Python, SQL, PHP, HTML, C++, C Sharp, Java, Visual Basic, or any other programming language) to interact with the system and/or data. For example, a user can execute a command to retrieve a data set, receive the data set, and/or manipulate the data set. A data set can be stored in a designated variable. User generated instructions can modify, transform, or filter data elements in the data set. For example, in some embodiments, portions of multiple data sets can be combined to form one new data set that is formatted in a particular format. A user can enter text-based instructions where the output can be rendered as a table, map, JSON, or other view. A user can easily retrieve a data set from a resource identifier for the data set. First, second, third, etc. instructions and results are presented in a sequential manner down the user interface page. The second, third, etc. instructions can refer to variables and output data from previous blocks in the user interface page. The interpreted user-generated textual instruction blocks retrieve the data set specified in the textual blocks, parses and executes the user's textual instructions to transform, filter, or manipulate the data set. The resulting data set is rendered according to the data type into a table, map, JSON, or other view. Each or a subset of the textual instruction blocks can be persisted, versioned, and permissioned according to access control lists. Some or all the instructions can be shared with other users. Some or all the instructions can be combined and used in or published as a service. The particular session of textual instruction blocks and transformations can be published as a service, which, if called again, can dynamically perform the user generated instructions and output the result data.

In some embodiments, a user can, with one click, automatically compile the written code into a shareable service so that other users can incorporate the steps as a function in their own code, database, or service. What could have taken significant amounts of time and effort and a specialized expertise, now may take less time and minimal knowledge or familiarity with coding and databases. A user can automatically, by the press of a button, create a service to pull data from a data pipeline, modify the data, and output a resulting data set automatically. Further, in some embodiments, a user can use the systems and methods described to focus the user's analysis on portions of a particular data set that is relevant to the user, and then publish the data to a shareable link. So that other users can click the link to view the relevant filtered and customized data that is up-to-date because it is pulling it from the data pipeline upon each refresh. For example, a user can download a data set listing all restaurant locations for a particular business with financial information associated with each branch. The user can modify, transform, and filter the large data set to show only the restaurants with negative profits (i.e., losses) and removing all columns that are not relevant. Then the user can publish the resulting table to a URL to share. Upon selecting the URL, any user can be shown an up-to-date list of restaurants with negative profits based on information that is currently in the data pipeline system. In some embodiments, because the information is pulled from the data pipeline system upon each user selection of the URL, the information will be as up-to-date as it is within the data pipeline system.

The described systems and methods for creating custom instructions and/or publishing a service that can be used later can simplify data interaction processes to be performed with less technical expertise and in less time. The benefit of clicking one button to generate a service can make the process easier and/or may require little to no prior experience with services.

As mentioned above, in some of existing database systems, simply accessing data can be a time-consuming process, let alone enabling an analyst to interact and manipulate the data. For example, the data may be stored in a various database tables, in various electronic resources or files, and/or may require knowledge of various complicated APIs to retrieve the data. Accordingly, a large and technically complex database system may present a barrier for analysts to analyze, investigate, and manipulate data.

Accordingly, the systems and techniques described herein may improve computer technology, the accessibility of data, and/or the reusability of user-generated computer instructions. The systems and techniques described herein can improve computer database technology by enabling users to possibly access and interact with database data quicker. Moreover, providing a framework for sharing and reusing user generated computer instructions can improve computer technology. The user generated instructions may be in one or more programming languages. Thus, the systems and techniques described herein can improve computer technology and/or may be inherently tied to computer technology.

The systems and techniques described herein may improve graphical user interfaces. For example, there may not be an existing graphical user interface similar to the one described herein for providing users the capability of interacting with database and/or file resources as described herein. Accordingly, the systems and techniques described herein can enable users to access data faster, perform analyses faster, and/or interact with one or more user interfaces faster than existing graphical user interface systems (such as by reducing the number of clicks or selections by a user). Thus, the systems and techniques described herein can provide an improved and/or novel user interface for database and/or file resources.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Block: a group of one or more user generated instructions, such as computer readable program instructions. For example, using the interactive interpreter system described herein, a user can enter instructions into a user input area. The collection of the user generated instructions can be stored as a "block." Also as used herein in the context of a flowchart, a "block" can refer to a step in a flowchart.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Interactive Interpreter System and Graphical User Interface

FIG. 1 illustrates an example graphical user interface 100 of an interactive interpreter system, according to various embodiments of the present disclosure. Further, FIGS. 2A-2C illustrate the example graphical user interface 100 of the interactive interpreter system from FIG. 1, showing further interactions and capabilities of the system, according to various embodiments of the present disclosure. The interactive interpreter system described with reference to FIG. 1, 2A, 2B, or 2C, or otherwise herein, can be the same interactive interpreter system 402 described in FIG. 4A or elsewhere herein.

In FIG. 1, the interactive interpreter system can receive textual instructions in input area 102. The present example assigns a data set within a database to a variable "failures". The data set includes 4 columns as depicted in result area 104 as a table of the first 5 elements of the data set. Additional data can be a part of the data set. For example, the interactive interpreter system can display a preview of data set, such as the first five elements of the data set in order of "failure_id." In some embodiments, the additional data can be shown. For example, a paginated frame can be shown so a user can page through subsets of the data (e.g., page 5 data items at a time from page one up to a last page), or the entire data set (in a large table for example) in a scrollable window to view many data rows and columns with scrolling. In some embodiments, prior to any entry of data by a user in input area 102, the input area can be empty like the input area 114. For example, there would be no associated result area and no reference label 120 associated with input area 102 until text is entered into the system and/or until a user selects the run element 118 that would appear next to the input area prior to any determinations. Once instructions are run by the interactive interpreter system, the run element can disappear and can be replaced with a service element 116A, for example, because the result area would be updated in real or near time upon any entry of code or update to the input area language. In some embodiments, the run element can remain and allow a user to update the associated result area upon any text updates to the associated input area.

In some embodiments, preparation of data sets by the data pipeline system (e.g., data pipeline system 428) can include formatting the data so that the interactive interpreter system can read the data or interpret the data properly. For example, data may be stored in one or more blocks, such that each block can be assigned an identifier. Also, in some embodiments, the data pipeline system can further filter data based on data access control restrictions. For example, particular users may have access to limited data sets, or limited data/metadata within a data set, and the data pipeline system and prevent transmission of such data. In some embodiments, the interactive interpreter system can include access controls so that even if secure data is retrieved or received from a data pipeline system, that prior to displaying any data to a particular user, the interactive interpreter system can filter the data based on the user access controls. Further, in some embodiments, both the data pipeline system and the interactive interpreter system can work together to filter restricted data from a particular user or multiple users.

Continuing with the example in FIG. 1, a user can input text into input area 106 in a programming language. For example, the user has entered instructions in the input area 106 to filter the data set retrieved from input area 102 to failures within the prior two weeks. In more detail, the instructions in the input area 106 can cause the interactive interpreter system to parse the data set, determine a date object from the parsed data, and apply a filter on the data set by applying a condition where the condition checks whether the date object is within the last two weeks. As shown by the instructions in the input area 106, the data set can be in a particular format, such as a JavaScript Object Notation (JSON) format. Other embodiments can support additional data formats, such as, XML and/or delimited formats such as CSV. The result area 108 is displayed to show the new table of the subset of data with the updated date column in the determined date format.

Continuing in FIG. 1, a user can input instructions into input area 110. For example, line 2 of input area 110 includes a similar database retrieval of a second data set as in input area 102. However, the instructions within the input area 110, when executed, can cause the system to retrieve and/or parse data to result in the "part_id," "name," and "manufactured_date" data columns. The resulting data is depicted in result area 112. When a user enters information into input area 114 and selects run, in some embodiments, input area 150 is created in FIG. 2A.

In FIG. 2A, the instructions in the input area 150, when executed, can cause the system to creates a map from "part_id" to "part." The output result of the execution of the instructions is depicted in the output data shown in the result area 152. The input into the function on line 2 of the input area 150 is the reference label "$3", which can refer to the output of the execution of the instructions from the input area 110 in FIG. 1. Execution of the instructions in the input area 154 can cause the system to map from "part_id" to the number of times the part failed (which can be done by referencing a variable generated from a previous block of instructions, such as the "failures_from_last_two_weeks" variable) that can result in the output in the result area 156.

In FIG. 2A, a user can input additional instructions in input area 158 that can cause the system to identify the parts with failure counts greater than 0. One input used is the reference label "$4", referring to the output of the executed instructions from the input area 150. Another input used is the "failure_frequency" variable that is generated from the execution of the instructions from the input area 154 and some of the data values for the "failure_frequency" variable can be shown in the output area 156. The resulting data from the execution of the instructions from the input area 158 is shown in the result area 160.

In FIG. 2B, in some embodiments, a user can continue editing the input area, such as input area 159 so that additional filtering instructions can be processed. For example, the additional instructions can be executed to identify a number of parts that failed the most frequently in the last 2 weeks (here five parts), which is output in the result area 161. In some embodiments, the result area 160 can be replaced by result area 161 upon the execution of an updated input area (i.e., input area 158 was updated to input area 159). As described herein, a user can then select the service element 116F to generate a service identifier, such as a URL, that references the generated service. The generated service can be shared with others in order to give access to the service at a later date. For example, the later execution of the service can cause the generated instructions to be executed dynamically. In this case, an up-to-date list of the top five parts that failed the most in the prior two weeks can be generated with a simple service or API call.

In some embodiments, the interactive interpreter system can display an area in the graphical user interface 100, such as the area 114, which can be configured to receive input from a user device (e.g., user device 424 described herein). For example, upon the receipt of inputted text, the graphical user interface 100 can update to display a corresponding area reference label 120 and display the text. When sufficient text has been entered a user can select an execute element 118 to generate an output based on the input text. Various examples showing the result of input text and associated outputs are shown in FIGS. 1-2C. For example, FIG. 1 shows three separate areas where a user has input text (i.e., areas 102, 106, and 110) and the associated results (i.e., areas 104, 108, and 112, respectively). In some embodiments, the results can be displayed upon selection of the execution element 118. In some embodiments, the results can be shown automatically in real or near time as a user types in text and instructions into the graphical user interface 100. In some embodiments, the results can be shown automatically in real or near-time as a user types but only when proper instructions are types so that any erroneous or unrecognizable instructions would not result in any presented results.

In some embodiments, each successive area can depend on the prior areas in order. For example, area 110 (labeled as "$3") can depend on area 106 (labeled as "$2"), which can depend on area 104 (labeled as "$1"). Calculations, results, and typed instructions can persist while a user continues creating new areas and results. Further, in some embodiments, although variables and data, transformations, and/or variables can persist, the areas comprising instructions (e.g., area 102) can be referenced as well, for example by using the label of "$1." In some embodiments, for example, a user can prepare a data set in an area which can be referenced by the area label 120 in a later area. FIGS. 2A-2C depict such a reference in areas 150 (referencing area 110 by using the label "$3"), 158 (referencing area 150 by using the label "$4"), and 159 (referencing area 150 by using the label "$4"). Thus, in some embodiments, with respect to area 158 or area 159, a reference can refer to the output of another area (e.g., area 150). In some embodiments, multiple references (e.g., two or more references to "$3" and a reference to "$4" can be used in a subsequent area. In some embodiments, the areas can be labeled sequentially (i.e., area "$1" then area "$2" and so forth). However, in other embodiments, another labeling convention can be used.

In some embodiments, the results areas (e.g., 104, 108, and 112) can include various presentation formats of data related to the associated input areas. For example, such formats can include tables, graphs, charts, tab delimited data, JavaScript Object Notation (JSON) data, geographical or geocoded data, XML data, or any other data format. In some embodiments, the presentation can default to a particular presentation format based on the data to be presented. For example, if data is returned from multiple sources with the same number and title of columns and rows, then a tabular format can be presented with the data elements. Although in some embodiments, each input area can be presented with a result area showing the output of the inputted instructions, there may be some embodiments or situations where a results area is not shown. For example, a results area may not be shown if data within a dataset is inconsistent with each other for default presentation purposes (i.e., geocoded data for a set of items and a 10 column tabular data set all of which are in a larger data set). In some embodiments, a default format of the data can be presented in those cases, such as by showing the geocoded data and the 10 column tabular data in a JSON data format. For example, in FIGS. 2A-2C, result areas 152 and 156 show lists of data rather than tables. In some embodiments, if there is an error in the input area, the result area can display the error. In some embodiments, as a user is typing inputs, the interactive interpreter system can detect errors and indicate which portions of text the interactive interpreter system believes to be in error, for example by highlighting the text or changing the color (e.g., to red). Such errors can include errors based on parsing the text and comparing it to the programming libraries loaded into the interactive interpreter system. Errors can also include typographical or syntax errors.

In some embodiments, it can be advantageous to present a limited amount of information in the result area as a preview result area rather than the full data set returned based on the input area, so that a user can quickly review the results in the graphical user interface 100 and determine additional filtering or steps to add to a current input area or a next input area. The current input area is the input area the user is currently working in and the next input area is an input area that has not been created yet or assigned a label (e.g., "$10").

The preview result area described can be in the format of a table that is paginated and/or with scroll bars on the sides enabling a user to scroll through the various columns of a table or paginate through pages. In some embodiments, the preview result area can list only a first set of results of the entire set of results to at least show the user what results are returned and how the results look (e.g., by analysis of a table's column names, column numbers, row numbers, and whether any results are returned at all) with or without pagination or scroll bars. However, with some result formats, such as graphical charts (e.g., a pie chart, bar graph, heat map, topographical map, etc.), incorporating all data into the results area may be necessary so that a user is presented with accurate information. For example, a pie chart would potentially be different if some data was withheld from its creation. Thus, depending on the visualization, all data may be useful to present an accurate chart. In cases where all data is not necessary, a portion of the data can be presented and remain accurate even though it is only a subset of the full result. In some embodiments, the result area can comprise a note or description warning the user that content has not been displayed, or is currently hidden from view. Also, when depicting a graphical chart, it may be beneficial to present the chart in a window that can be expanded, zoomed into or out of, or minimized, so that further code development can be performed by the user without an obtrusive pie chart on the screen taking up limited screen space. In some embodiments, there may additionally be a default presentation format for various types of data. For example, if geocoded data is selected, then a map may be the default presentation method so that a map is presented with the various data plotted onto the map and the map zoomed in to the relevant portion of the map showing the data. In some embodiments, with respect to presenting a map, a large portion of data may be in one area (e.g., the United States), and relatively few data may appear in another area (e.g., Australia) either due to outlier information or errors, for example. In this case, the map can be zoomed into to show only the United States where the majority of geocoded data is related to and plotted.

In some embodiments, while, or after, an output or result is generated and displayed in an associated result area, a user can enter additional instructions into the input area to further update the result area contents. Alternatively, or in addition to, a user can begin a new input area and incorporate additional instructions (e.g., by referencing the prior input area and continuing filtering in that way). In some embodiments, if data is returned with a different number of columns or rows, or the columns or rows have different names or data types, the presentation format can be shown in a default format, such as a JSON default format. In some embodiments, a user can select a user interface element (e.g., a button or drop down list) to quickly toggle the preferred format or display settings (e.g., show all data versus a portion, or zoom in or out of a graphical chart or map, etc.).

In some embodiments, various types of programming languages can be supported by the interactive interpreter system for executing instructions. Example programming languages can include JavaScript, Python, SQL, PHP, HTML, C++, C Sharp, Java, Visual Basic, or any other programming language. For example, if text is input into a dynamically interactive input area, the interactive interpreter system 402 and/or user device(s) 424 can parse the input text to execute. In some embodiments, various coding libraries can be loaded into the interactive interpreter system to assist with interpreting the inputs. In some embodiments, the interactive interpreter system (e.g., interactive interpreter system 402) and/or a user device (e.g., user device(s) 424) might require the loading of various software libraries to enable parsing of the inputted text into correct instructions. In some embodiments, the interactive interpreter system may also be limited to one or a few programming languages, or a preconfigured pseudocode format, that a user is limited to using. In some embodiments, there can also be user access controls implemented by the system configured by a system administrator. For example, a user, depending on the interactive interpreter system configuration or user access control settings, may be limited to performing only a limited subset of functions within a programming language or be limited to a particular programming language. For example, the user can primarily use JavaScript, such as in FIGS. 1-2C, to interact with databases, data, and the interactive interpreter system. Further, depending on the interactive interpreter system configuration or user access control settings, a user may also be limited to the data accessible as well.

In some embodiments, a user can select elements 116A-116F to create a service or API based on the current input area and/or previous input areas. A service can be an architectural style that structures an application as a collection of loosely coupled services, which implement business capabilities. For example, in FIG. 2B, if a user selected element 116F, then the interactive interpreter system can generate an API configurable through a curl 164, or client for URLs, and endpoint 162 based on input area 159 and some or all previous input areas (i.e., input areas 152, 110, 106, and/or 102). FIG. 2C depicts the graphical user interface 100 after a user selected element 116F. The element 116F can update to indicate it has been selected, and the graphical user interface can present API information (e.g., curl or TypeScript) to the user.

In some embodiments, the user can save or share this API information to use in other systems going forward. Upon selection of the elements 116A-116F, the interactive interpreter system can reconfigure the instructions to an appropriate format automatically to generate the API. For example, in FIG. 2B, the interactive interpreter system would combine the input areas 159, 152, 110, 106, and 102 and also incorporate the various input area results into the reference calls in the other input areas (e.g., reference call "$4" in input area 158 would cause the interactive interpreter system to either pull the result from result area 152 or determine the result of input area 150 and incorporate that into the reference call in input area 158) prior to generating the API or service. Further, in some embodiments, the interactive interpreter system can further allow a user to input parameters and publish the service upon selecting the elements 116A-116F. The described systems and methods for creating custom instructions and converting to API or service information provides a simplified process with less technical expertise and in less time. In some embodiments, the benefit of clicking one button to generate an API or service can make the whole process easier and requires little to no prior experience with services to generate or service functions. The service information can persist regardless of the front-end user device memory constraints. The service can be used in other systems separate from the user device. In some embodiments, all inputs and determined results may be stored locally or remotely. The service can be persisted such that a user can later edit the service and/or generate additional services based on the prior work done.

In some embodiments, various inputs can be stored in a database and persisted through various system shutdowns or user log-offs. Thus, if the user generated instructions are executed at a later time, the results of the instructions can be determined dynamically. Additionally or alternatively, some of the results of the user generated instructions may be stored. A user may be able to save his or her work and resume the work upon opening the relevant application or browser page and see the prior work and results. Thus, the instructions and/or data can be persisted such that the user can later revisit the instructions and/or data.

FIG. 3 illustrates a flow chart diagram 300 illustrating functionality of the interactive interpreter system 402 related to various inputs and outputs of the system, according to various embodiments of the present disclosure. The steps and/or blocks of FIG. 3 should be interpreted to be acceptable in no particular order, except where the system or method would not function for its intended purpose. One or more of the blocks described may be optional in certain implementations. Additionally, the discussion below and herein describes features associated with an interactive interpreter system 402 and features associated with one or more user device(s) 424, as well as any other system used to assist in implementing or enhancing the features described herein. In some embodiments, the interactive interpreter system 402 can encompass some or all of the features of the user device(s) 424. The graphical user interface can be the same graphical user interface 100 as described above with reference to FIGS. 1 and 2A-2C. In some embodiments of the flow chart diagram 300, while certain blocks are shown as being performed by the user device(s) 424, in other embodiments, those block(s) can be performed by the interactive interpreter system 402, such as receiving certain user input or data, or causing presentation of an updated graphical user interface.

At block 302, the interactive interpreter system 402 can cause presentation of a graphical user interface (e.g., the graphical user interface 100 of FIGS. 1 and 2A-2C). In some embodiments, the graphical user interface includes dynamically interactive areas, as described herein. The dynamically interactive input areas can receive input and instructions from a user instructing the interactive interpreter system 402 to retrieve data, manipulate data, and/or publish to a service, as described herein.

At block 303, the user device(s) 424 can receive the display instructions from the interactive interpreter system 402 regarding how to display the graphical user interface. At block 304, the user device(s) 424 displays the graphical user interface such that the graphical user interface includes at least one or more dynamically interactive input areas configured to receive inputs. In some embodiments the inputs can be text and/or instructions (e.g., JavaScript, python, C++, Java, or the like). For example, if text is input into a dynamically interactive input area, the interactive interpreter system 402 and/or user device(s) 424 can parse the input text into instructions for execution. In some embodiments, various software libraries can be used by the interactive interpreter system 402 and/or the user device(s) 424 to interpret the user input including the text and/or instructions.

In some instances, at block 306, the user device(s) 424 receive(s) an input of first user generated computer-executable instructions comprising at least a resource identifier. As described herein, the resource identifier can refer to a resource in a database system, such as a data pipeline system. Then the user device(s) 424 transmit(s) the first user generated computer-executable instructions comprising at least a resource identifier to the interactive interpreter system 402.

At block 308, the interactive interpreter system 402 receives the first user generated computer-executable instructions comprising at least a resource identifier and processes the information. Also, at block 308, the interactive interpreter system 402 receives or retrieves one or more data sets prepared at block 310 by a database system, such as the data pipeline system 428. In some embodiments, the resource identifier can identify a resource location to retrieve the data set, such as a location on a file system.

Additionally or alternatively, processing the information can include looking up the data in a data structure, such as a graph, searching additional databases for data or metadata pertaining to the resource identifier, or any other method desirable user or that would otherwise improve the efficiency of the system. For example, in some embodiments, processing can include traversal of every piece of data in a particular data set to analyze and determine which data is associated with the resource identifier. Additionally or alternatively, the data set can be stored in an index, such as a hash data structure, which contains information about what storage location the data is in. Further, in some embodiments, preparation of data sets by the data pipeline system 428 can include formatting the data so that the interactive interpreter system 402 can read the data or interpret the data properly. Also, in some embodiments, the data pipeline system 428 can further filter data based on data access control restrictions. For example, particular users may have access to limited data sets, or limited data/metadata within a data set, and the data pipeline system 428 and prevent transmission of such data. Thus, an authorization token or user identifier can be retrieved and/or received by the interactive interpreter system 402 for a user of the user device(s) 424. In some embodiments, the interactive interpreter system 402 can include access controls so that even if secure data is retrieved or received from a data pipeline system 428, that prior to displaying any data to a particular user, the interactive interpreter system 402 can filter the data based on the user access controls. Further, in some embodiments, both the data pipeline system 428 and the interactive interpreter system 402 can work together to filter restricted data from a particular user or multiple users. Then, the data set is sent to block 316 described below.

In other instances, at block 312, the user device(s) 424 receive(s) an input of second user generated computer-executable instructions corresponding to a particular operation. Then the user device(s) 424 transmit(s) the second user generated computer-executable instructions corresponding to a particular operation to the interactive interpreter system 402 for processing an execution. In some embodiments, the interactive interpreter system 402 can process and execute the first user generated computer-executable instructions. In other embodiments, the user device(s) 424 can process and execute the first user generated computer-executable instructions. Additionally or alternatively, both the interactive interpreter system 402 and user device(s) 424 can process and/or execute different portions of the first user generated computer-executable instructions. Therefore, in some embodiments, the interactive interpreter system 402 and user device(s) 424 may operate independently with separate capabilities and tasks. In some embodiments, the user device(s) 424 can include the interactive interpreter system 402 and execute the user generated computer-executable instructions within the user device(s) 424.

At block 314, the interactive interpreter system 402 receives the second user generated computer-executable instructions corresponding to a particular operation and processes the information. In some embodiments, processing the information can include executing a software library, such as an interpreter, to parse the instructions and determine one or more operations to be performed. Example operations can include performing one or more logical operations on a data set, extracting data from the data set, modifying data from the data set, merging data from multiple data sets, and/or any other operation supported by a programming language.

At block 316, the interactive interpreter system 402 receives the data set(s) from block 308 and the processed operation from block 314 to perform or execute the determined operation on the data set. At block 318, the interactive interpreter system 402 generates an output from the operation.

At block 320, the interactive interpreter system 402 can cause presentation of a graphical user interface (e.g., the graphical user interface 100 of FIGS. 1 and 2) including the generated output from block 318. As described herein, presentation of the output can be based on a determination by the interactive interpreter system 402 regarding a data type of the output. Additionally or alternatively, a user can specify a format for the presentation of the output.

At block 322, the user device(s) 424 receive(s) the graphical user interface including the generated output from block 318. Then at block 323, the user device(s) 424 presents the graphical user interface including a presentation of the generated output from block 318.

At block 324, after the user device(s) 424 receive(s) the first user generated computer-executable instructions at block 306 and/or the second user generated computer-executable instructions at block 312, the interactive interpreter system retrieves or receives the first and second user generated computer-executable instructions and stores the instructions. In some embodiments, only one of the first and second user generated computer-executable instructions can be stored. In some embodiments, the first and second user generated computer-executable instructions can be stored in the remote database 426, a local database 420, and/or a relationship database 427. As described herein, the user generated computer-executable instructions can be published as a service. In some embodiments, the user generated computer-executable instructions can include input parameters. Accordingly, a published service can receive input parameters that are used by the user generated computer-executable instructions upon execution.

In some embodiments, a user can cause the interactive interpreter system to store one or more of the user generated blocks. For example, the interactive interpreter system 402 can store all of the blocks from a particular user session, such as all of the blocks that correspond to the input areas of FIGS. 1 and 2A-2C. Additionally or alternatively, the user interface may include an option that enables a user to persist any individual block from a particular user session with the interactive interpreter system 402. For example, if a user selects an option for a particular block for persistence, the interactive interpreter system 402 can determine any dependencies that the selected block relies upon, such as any previous blocks that the selected block depends upon or another previously persisted block. The interactive interpreter system 402 can use a parser to determine whether an instruction from a particular block refers to any other variables, output data, and/or instructions from other blocks. Thus, a user selection to persist a particular block can cause multiple blocks to be persistent. Moreover, the interactive interpreter system 402 can store any edits to a particular block using a versioning system. When a user stores one or more blocks, the user can provide a name for the one or more blocks and/or select one or more users or groups that have access the blocks. Thus, a user can access stored blocks in a graphical user interface for a repository of user generated blocks.

Figure 4A:
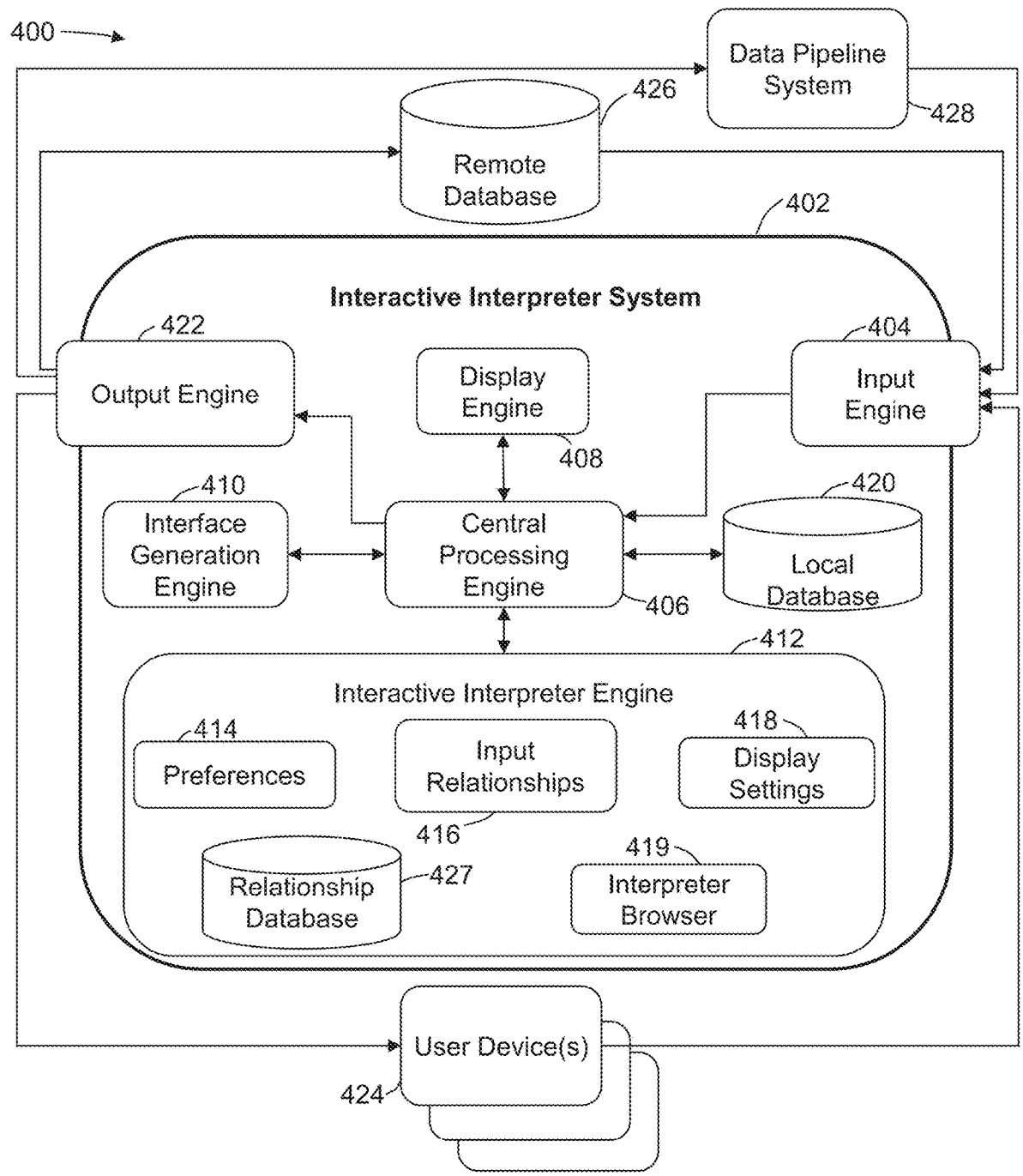
FIG. 4A illustrates an embodiment of a block diagram of the interactive interpreter system, also illustrating how the components are in communication with each other.

FIG. 4A illustrates an embodiment 400 of a block diagram of an interactive interpreter system 402, also illustrating how the components are in communication with each other. The interactive interpreter system 402 may be the same as the interactive interpreter system described in FIG. 3 and herein. Also, the interactive interpreter system 402 includes many components. The components described herein are not meant to be exhaustive but only a sample of what components may be implemented in an interactive interpreter system 402. Some components may be combined and others may be removed or substituted with similar components.

The interactive interpreter system 402, as described in FIG. 4A, includes an input engine 404, an interactive interpreter engine 412, a central processing engine 406, an interface generation engine 410, a display engine 408, an output engine 422, and a local database 420. The user device(s) 424 can be the same user devices as described herein, each user device having access to view a graphical user interface of the interactive interpreter system 402. The data pipeline system 428 can be the same data pipeline system as described herein. The remote database 426, user device(s) 424, and data pipeline system 428 may communicate with the interactive interpreter system 402 over a local area network, the internet, some combination thereof, or any other suitable means. In some embodiments, the remote database 426, local database 420, and/or relationship database 427 can store data sets, files, or metadata for data sets or files. The remote database 426 may also be a local network database or a local database 420 in some implementations, or as a part of the interactive interpreter engine 412 (for example, the relationship database 427).

In some embodiments, the relationship database 427 may only comprise related metadata. In some embodiments, the data, instructions, or code can be stored in a blockchain or distributed ledger, using distributed ledger technology. For example, data can be converted using the InterPlanetary File System (IPFS) protocol to create a content-addressable, peer-to-peer method of storing data in a distributed file system. The IPFS protocol would break a particular file into multiple pieces, sign it cryptographically, and store it on difference computer nodes around the world. The protocol would return a hash which can uniquely identify the file. The hash can then be stored on a blockchain or distributed ledger. To retrieve the file, the blockchain or distributed ledger network can be queried to pull out the hash. With the hash, a query can be sent to IPFS network with the retrieved hash. Then the IPFS network will return the original file. This ensures that the uploaded file is secure, stored permanently, and cannot be tampered with.

The input engine 404 interfaces with one or more user device(s) 424 through a local area network or the internet. User device(s) 424 may provide instruction or information to the interactive interpreter system 402. The input engine 404 also interfaces with a remote database 426 and a data pipeline system 428. The remote database 426 and data pipeline system 428 can provide information to the interactive interpreter system 402 through the input engine 404. In some embodiments, data can be pushed to the interactive interpreter system 402 from the remote database 426 or data pipeline system 428, and/or the interactive interpreter system 402 can retrieve data from the remote database 426 or data pipeline system 428. The input engine 404 receives then sends any instructions or information to the central processing engine 406.

The central processing engine 406 receives data and information from the input engine 404 and processes the data depending on the methods described in FIG. 3 and herein, for example. In one embodiment, the central processing engine 406 sends data to an interactive interpreter engine 412, an interface generation engine 410, and a display engine 408. The central processing engine 406 also communicates with the display engine 408, the interface generation engine 410, and the output engine 422.

The interactive interpreter engine 412 includes preferences 414, input relationships 416, display settings 418, a browser 419, and a relationship database 427. In some embodiments, certain aspects of the interactive interpreter engine 412 can be performed by a back-end server and other aspects can be performed by a user's computing device. In some embodiments, the interactive interpreter system 402 can be just the user device 424 or a back-end server. The preferences 414 can comprise various customizations or preferences one or more user device(s) 424, or administrators, preconfigured on how the one or more users associated with the user device(s) 424 prefers to view the various data, or how members of a group prefer to view the data. In some embodiments, the preferences 414 can be based on the associated user's title or role in a company, or device characteristics (e.g., hardware, software, location, etc.). The data relationships 416 and/or display settings 418 can comprise various customizations or preferences on how the members of a particular group prefer to view the data. For example, user device(s) 424 within a certain department in an organization may be presented with a graphical user interface that is different from what user device(s) 424 in another department are presented with. The display settings 418 can be based partly on the preferences 414 or data relationships 416, but also include any particular preferences for each data set, as opposed to instructions or settings pertaining to data generally. For example, the display settings 418 can include for a particular data set, or set of resources, retrieved from a data pipeline system 428, for example, formatting instructions based on the user, group, administrator, or the like for a data set to appear in a certain way on the graphical user interface, present a certain set of data, and/or be located in a certain location on the graphical user interface. Additionally, the interactive interpreter engine 412 may include an interpreter browser 419 for user device(s) 424 to interact with the graphical user interface (for example, the graphical user interface 100 in FIG. 1). A relationship database 427 may also be a component of the interactive interpreter engine 412 and be used to store data sets, files, or relationship metadata for data sets or files. In some embodiments, the browser 419 may also include the relationship database 427, or a local database 420. Finally, each determination made by the interactive interpreter engine 412 is transmitted to the central processing engine 406 for eventual rendering and generating a graphical user interface.

The interface generation engine 410 creates a user interface based on instructions received from the user device(s) 424. Such instructions may include instructions on what graphical user interface to create, and/or what data the interactive interpreter system 402 should obtain from the remote database 426. The remote database 426 may comprise a plurality of databases. Also, for example, the interface generation engine 410 can send a request for data to the remote database 426 and/or data pipeline system 428, which can then send information to the input engine 604, to be processed by the central processing engine 406, and to then be used in the creation of tables, charts, or data sets by the interactive interpreter engine 412, which will then be used to create a graphical user interface by the interface generation engine 410. Upon completion of creating or updating graphical user interface, the rendered graphical user interface is transmitted to the central processing engine 406 to determine any further updating, filtering, formatting, or processing of data.

The display engine 408 receives the final instructions from the central processing engine 406 on how to display the graphical user interface (for example, the graphical user interface 100 in FIG. 1) for each user device 424. The display engine 408 outputs customized information to the user device(s) 424 for viewing and interacting with.

In an implementation the interactive interpreter system 402 (or one or more aspects of the interactive interpreter system 402) can include, or be implemented in, a "virtual computing environment." As used herein, the term "virtual computing environment" should be construed broadly to include, for example, computer readable program instructions executed by one or more processors (e.g., as described below in the example of FIG. 6) to implement one or more aspects of the modules and/or functionality described herein. Further, in this implementation, one or more modules or engines (e.g., input engine 404, output engine 422, interface generation engine 410, display engine 408, central processing engine 406, and/or interactive interpreter engine 412) of the interactive interpreter system 402 may be understood as comprising one or more rules engines of the virtual computing environment that, in response to inputs received by the virtual computing environment, execute rules and/or other program instructions to modify operation of the virtual computing environment. For example, a request received from the user device(s) 424 may be understood as modifying operation of the virtual computing environment to cause the interactive interpreter engine 412 to generate interfaces, the interface generation engine 410 to generate a user interface, the display engine 408 to display the interface, and the output engine 422 to transmit the rendered interface back to the user device(s) 424. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by input engine 404 from the remote database 426. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the interactive interpreter system 402 as a virtual computing environment may advantageously enable executing different aspects or modules of the system on different computing devices or processors, which may increase the scalability of the system. Implementing one or more aspects of the interactive interpreter system 402 as a virtual computing environment may further advantageously enable sandboxing various aspects, data, or modules of the system from one another, which may increase security of the system by preventing, e.g., malicious intrusion into the system from spreading. Implementing one or more aspects of the interactive interpreter system 402 as a virtual computing environment may further advantageously enable parallel execution of various aspects or modules of the system, which may increase the scalability of the system. Implementing one or more aspects of the interactive interpreter system 402 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Example Data Pipeline Context

Figure 4B:
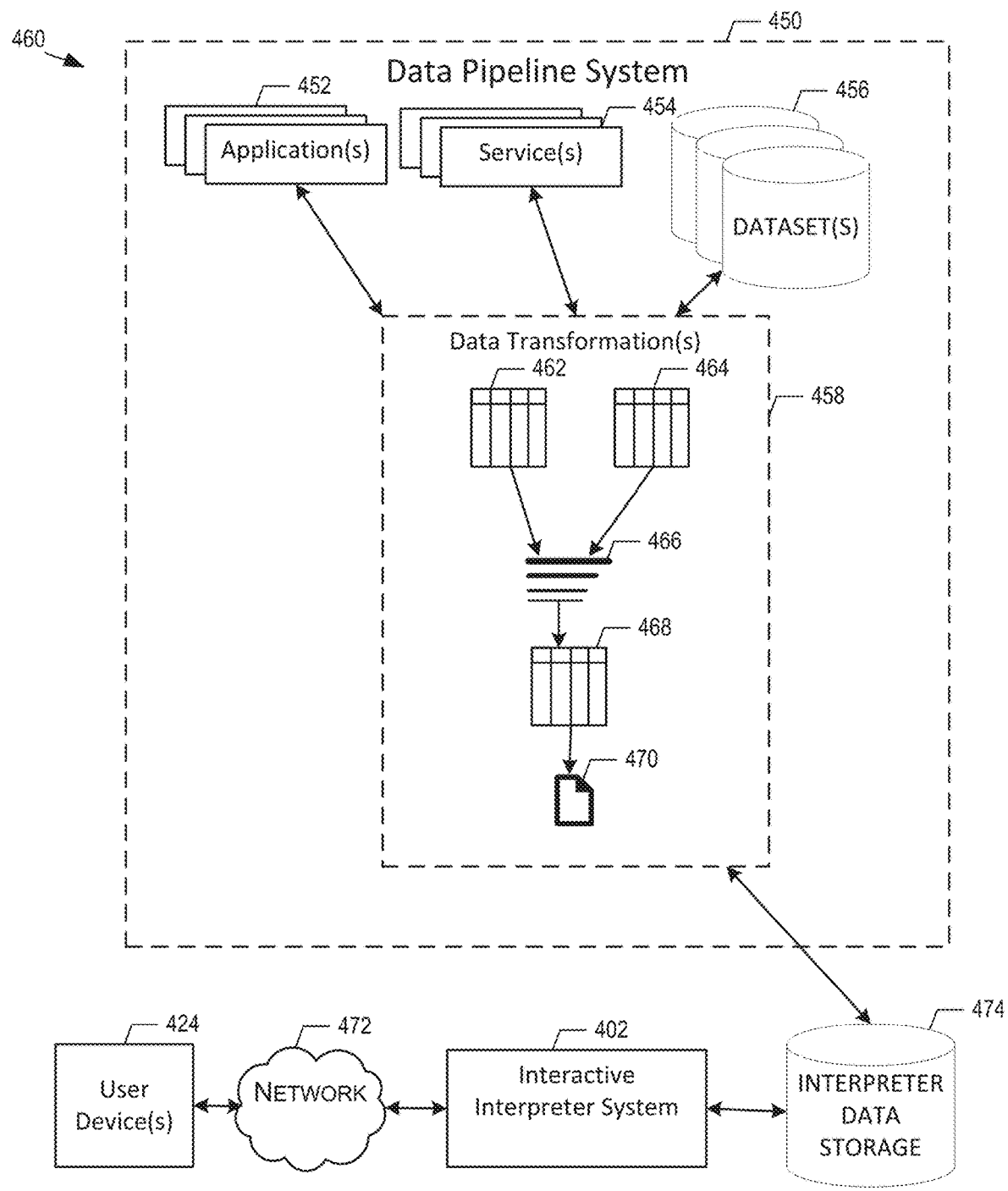
FIG. 4B is a block diagram illustrating an example interactive interpreter system in a data pipeline context, according to various embodiments of the present disclosure.

FIG. 4B illustrates an interactive interpreter system 402 in a data pipeline context, according to some embodiments of the present disclosure. In the embodiment of FIG. 4B, the computing environment 460 can be similar to the computing environments described herein with respect to the other Figures. For example, the computing environment 460 can include a network 472, an interactive interpreter system 402, user device(s) 424, and an interpreter data storage 474, each of which may be similar to respective devices and systems in computing environments described herein with respect to the other Figures. For example, the interpreter data storage 474 can be included in the interactive interpreter system 402, or the interpreter data storage 474 can be one or more of the remote database 426, local database 420, and/or relationship database 427. However, the computing environment 460 can also include a data pipeline system 450.

The example data pipeline system 450 includes one or more applications 452, one or more services 454, one or more initial data sets 456, and a data transformation process 458 (also referred to herein as a build process). The one or more services 454 can be different from a user generated service from the interactive interpreter system 402 of FIG. 4A. The data pipeline system 450 can transform data and record the data transformations. The one or more applications 452 can include applications that enable users to view data sets, interact with data sets, filter data sets, and/or configure data set transformation processes or builds. The one or more services 454 can include services that can trigger the data transformation builds and API services for receiving and transmitting data. The one or more initial data sets 456 can be automatically retrieved from external sources and/or can be manually imported by a user. The one or more initial data sets 456 can be in many different formats such as a tabular data format (SQL, delimited, or a spreadsheet data format), a data log format (such as network logs), or time series data (such as sensor data).

The data pipeline system 450, via the one or more services 454, can apply the data transformation process 458. An example data transformation process 458 is shown. The data pipeline system 450 can receive one or more initial data sets 462, 464. The data pipeline system 450 can apply a transformation to the data set(s). For example, the data pipeline system 450 can apply a first transformation 466 to the initial data sets 462, 464, which can include joining the initial data sets 462, 464 (such as or similar to a SQL JOIN), and/or a filtering of the initial data sets 462, 464. The output of the first transformation 466 can include a modified data set 468. A second transformation 470 of the modified data set 468 can result in an output data set 470, such as a report. Each of the steps in the example data transformation process 458 can be recorded by the data pipeline system 450 and made available as a resource to the GUI system 100. For example, a resource can include a data set and/or a data set item, a transformation, or any other step in a data transformation process. As mentioned above, the data transformation process or build 458 can be triggered by the data pipeline system 450, where example triggers can include nightly build processes, detected events, or manual triggers by a user. Additional aspects of data transformations and the data pipeline system 450 are described in further detail below.

The techniques for recording and transforming data in the data pipeline system 450 may include maintaining an immutable history of data recording and transformation actions such as uploading a new data set version to the system 450 and transforming one data set version to another data set version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "data sets." More specifically, a data set may encompass an ordered set of conceptual data set items. The data set items may be ordered according to their version identifiers recorded in the catalog. Thus, a data set item may correspond to a particular version of the data set. A data set item may represent a snapshot of the data set at a particular version of the data set. As a simple example, a version identifier of '1' may be recorded in the catalog for an initial data set item of a data set. If data is later added to the data set, a version identifier of '2' may be recorded in the catalog for a second data set item that conceptually includes the data of the initial data set item and the added data. In this example, data set item '2' may represent the current data set version and is ordered after data set item '1'.

As well as being versioned, a data set may be immutable. That is, when a new version of the data set corresponding to a new data set item is created for the data set in the system, pre-existing data set items of the data set are not overwritten by the new data set item. In this way, pre-existing data set items (i.e., pre-existing versions of the data set) are preserved when a new data set item is added to the data set (i.e., when a new version of the data set is created). Note that supporting immutable data sets is not inconsistent with pruning or deleting data set items corresponding to old data set versions. For example, old data set items may be deleted from the system to conserve data storage space.

A version of data set may correspond to a successfully committed transaction against the data set. In these embodiments, a sequence of successfully committed transactions against the data set corresponds to a sequence of data set versions of the data set (i.e., a sequence of data set items of the data set).

A transaction against a data set may add data to the data set, edit existing data in the data set, remove existing data from the data set, or a combination of adding, editing, or removing data. A transaction against a data set may create a new version of the data set (i.e., a new data set item of the data set) without deleting, removing, or modifying pre-existing data set items (i.e., without deleting, removing, or modifying pre-existing data set versions). A successfully committed transaction may correspond to a set of one or more files that contain the data of the data set item created by the successful transaction. The set of files may be stored in a file system.

In the catalog, a data set item of a data set may be identified by the name or identifier of the data set and the data set version corresponding to the data set item. In a preferred embodiment, the data set version corresponds to an identifier assigned to the transaction that created the data set version. The data set item may be associated in the catalog with the set of files that contain the data of the data set item.

In a preferred embodiment, the catalog treats the set of files as opaque. That is, the catalog itself may store paths or other identifiers of the set of files but may not otherwise open, read, or write to the files.

In sum, the catalog may store information about data sets. The information may include information identifying different versions (i.e., different data set items) of the data sets. In association with information identifying a particular version (i.e., a particular data set item) of a data set, there may be information identifying one or more files that contain the data of the particular data set version (i.e., the particular data set item).

The catalog may store information representing a non-linear history of a data set. Specifically, the history of a data set may have different data set branches. Branching may be used to allow one set of changes to a data set to be made independent and concurrently of another set of changes to the data set. The catalog may store branch names in association with data set version identifiers for identifying data set items that belong to a particular data set branch.

The catalog may provide data set provenance at the transaction level of granularity. As an example, suppose a transformation is executed in the data pipeline system 450 multiple times that reads data from data set A, reads data from data set B, transforms the data from data set A and the data from data set B in some way to produce data set C. As mentioned, this transformation may be performed multiple times. Each transformation may be performed in the context of a transaction. For example, the transformation may be performed daily after data sets and B are updated daily in the context of transactions. The result being multiple versions of data set A, multiple versions of data set B, and multiple versions of data set C as a result of multiple executions of the transformation. The catalog may contain sufficient information to trace the provenance of any version of data set C to the versions of data sets A and B from which the version of data set C is derived. In addition, the catalog may contain sufficient information the trace the provenance of those versions of data sets A and B to the earlier versions of data sets A and B from which those versions of data sets A and B were derived.

The provenance tracking ability is the result of recording in the catalog for a transaction that creates a new data set version, the transaction or transactions that the given transaction depends on (e.g., is derived from). The information recorded in the catalog may include an identifier of each dependent transaction and a branch name of the data set that the dependent transaction was committed against.

According to some embodiments, provenance tracking extends beyond transaction level granularity to column level granularity. For example, suppose a data set version A is structured as a table of two columns and a data set version B is structured as a table of five columns. Further assume, column three of data set version B is computed from column one of data set version A. In this case, the catalog may store information reflecting the dependency of column three of data set version B on column one of data set version A.

The catalog may also support the notion of permission transitivity. For example, suppose the catalog records information for two transactions executed against a data set referred to in this example as "Transaction 1" and "Transaction 2." Further suppose a third transaction is performed against the data set which is referred to in this example as "Transaction 3." Transaction 3 may use data created by Transaction 1 and data created by Transaction 2 to create the data set item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column-level. In this case, permission may be revoked (or granted) on a particular column of a data set and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output data set to be computed based on one or more input data sets each represented by a node in the graph with a directed edge between node(s) representing the input data set(s) and the node representing the output data set. The build service traverses the DAG in data set dependency order so that the most upstream dependent data sets are computed first. The build service traverses the DAG from the most upstream dependent data sets toward the node representing the output data set rebuilding data sets as necessary so that they are up-to-date. Finally, the target output data set is built once all of the dependent data sets are up-to-date.

The data pipeline system 450 can support branching for both data and code. Build branches allow the same transformation code to be executed on multiple branches. For example, transformation code on the master branch can be executed to produce a data set on the master branch or on another branch (e.g., the develop branch). Build branches also allow transformation code on a branch to be executed to produce data sets on that branch. For example, transformation code on a development branch can be executed to produce a data set that is available only on the development branch. Build branches provide isolation of re-computation of graph data across different users and across different execution schedules of a data pipeline. To support branching, the catalog may store information represents a graph of dependencies as opposed to a linear dependency sequence.

The data pipeline system 450 may enable other data transformation systems to perform transformations. For example, suppose the system stores two "raw" data sets R1 and R2 that are both updated daily (e.g., with daily web log data for two web services). Each update creates a new version of the data set and corresponds to a different transaction. The data sets are deemed raw in the sense that transformation code may not be executed by the data pipeline system 450 to produce the data sets. Further suppose there is a transformation A that computes a join between data sets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all data sets that depend on an upstream data set or an upstream transformation that has been updated are automatically determined based on information in the catalog and rebuilt. In this case, the build service may accept a target data set or a target transformation as an input parameter to a push build command. The build service than determines all downstream data sets that need to be rebuilt, if any.

As an example, if the build service receives a push build command with data set R1 as the target, then the build service would determine all downstream data sets that are not up-to-date with respect to data set R1 and rebuild them. For example, if data set D1 is out-of-date with respect to data set R1, then data set D1 is rebuilt based on the current versions of data sets R1 and R2 and the current version of transformation A. If data set D1 is rebuilt because it is out-of-date, then data set D2 will be rebuilt based on the up-to-date version of data set D1 and the current version of transformation B and so on until all downstream data set of the target data set are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a data set or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from data sets and those updates to be tracked separately. For example, suppose a comma separated file is uploaded to the system as particular data set version. The catalog may store in association with the particular data set version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of data sets and schema information. For example, suppose transformation A described above in a previous example that accepts the data set R1 and data set R2 as input is the target of a build command issued to the build service. In response to this build command, the build service may determine from the catalog the file or files in which the data of the current versions of data sets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

General API Module

Various third-parties operate electronic services systems. In some instances, these systems may allow access through Application Programming Interfaces (APIs). Typically, each API requires its own set of information about a data object, such as name, age, and height for a data object representing a person. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format; for example, third-party A may require a data object's name and age properties, whereas third-party B may require an a data object's age and height properties but not name.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

In some embodiments, an API can be generated by the interactive interpreter system so that various users can access previously written methods of accessing and/or interacting with data. For example, a user may export a series of steps into an API that users within the interactive interpreter system can use as a shortcut to determining values related to a particular data set to increase efficiency and effectiveness of an analysis. A notification may also be created for one or more users based on the API created. In another example, users external to the interactive interpreter system can access and use the API with data that may be stored within the interactive interpreter system or, in some cases, external to the interactive interpreter system.

Figure 5A:
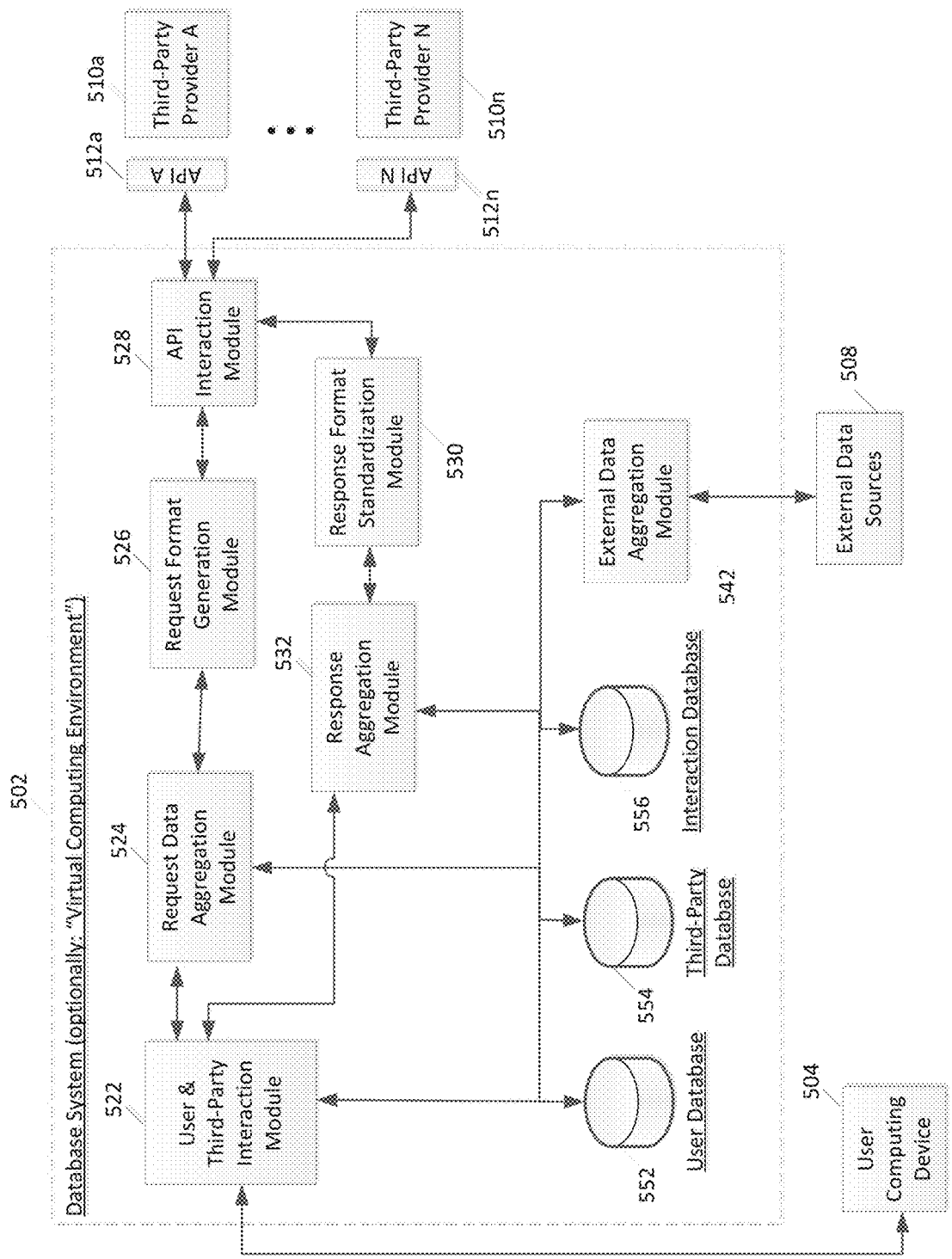
FIG. 5A is a block diagram showing various aspects of a database system and network environment in which the database system may be implemented, according to various embodiments of the present disclosure.

FIG. 5A is a block diagram showing various aspects of a database system 502 and network environment in which the database system may be implemented, according to various embodiments of the present disclosure. As shown in FIG. 5A, the database system 502 includes various modules and databases, and it communicates with various external devices and systems. Specifically, according to an embodiment the database system 502 includes a user and third-party interaction module 522, a request data aggregation module 524, a request format generation module 526, an API interaction module 528, a response format standardization module 530, a response aggregation module 532, an external data aggregation module 542, a user database 152, a third-party database 154, and an interaction database 556. The database system 502, according to an embodiment, may communicate with various external devices and systems, including a user computing device 504, one or more external data sources 508, and one or more APIs 512a-n that are associated with respective third-parties 510a-n.

As described below, the various modules of the database system 502 may comprise computer readable program instructions that may, in some embodiments, be logically divided as shown in FIG. 5A (for purposes of clarify and illustration), or may, in other embodiments, be combined or organized differently. Further, in some implementations aspects of the modules of the database system 502 may be organized differently or performed in parallel. For example, aggregation and analysis of responses (an aspect described in reference to response aggregation module 532 below) may be performed in parallel with, or before, standardization of responses (an aspect described in reference to response format standardization module 532 below).

In various embodiments, the various external devices and systems may communicate with the database system 502 via any suitable communications medium or protocol. For example, the various external devices and systems may communicate with the database system 502, and/or with one another, via any combination of local and remote network, the Internet, wired or wirelessly, and/or the like. Further, in various embodiments aspects of any of the modules and/or databases of the database system 502, and/or the various external devices and systems, may be organized differently from what is shown in the example illustration of FIG. 5A. For example, in some implementations the database system 502 may be comprised of multiple separate computing systems or devices and may communicate with one another to accomplish the functionality described herein.

User and third-party interaction module 522 provides an interface, such as a GUI to user computing devices, such as user computing device 504. Interaction module 522 may be configured to store data received from user computing device 504 in a user database 552, and to store data received from a third-party A 510a in a third-party database. For example, a user may provide, through user computing device 504, various data to third-parties. Similarly, a third-party may provide various information related to a third party. Interaction module 522 may also receive, from both user computing device 504 and/or third party data.

User and third-party interaction module 522 may also receive an indication from user computing device 504 that a user is willing to interact with one or more third-parties, such as third-party A 510a to third-party N 510n. Similarly, user and third-party interaction module 522 may receive an indication from a third-party that a third-party would be willing to enter into such a transaction with a user.

User and third-party interaction module 522 may be configured to generate user interface data useable for rendering the various interactive user interfaces described herein, so as to enable receipt and providing of data to, for example, users and third-parties. The user interface data may be used by the system, and/or another computer system, device, and/or software program (for example, a browser program), to render the interactive user interfaces. The interactive user interfaces may be displayed on, for example, electronic displays (including, for example, touch-enabled displays) of, for example, user computing device 104.

Advantageously, because user and third-party interaction module 522 and request data aggregation module 524 have access to user database 552 and third-party databases 554 (among other aspects and modules of the database system 502), interaction module 522 and request data aggregation module 524 may have a comprehensive view of an interaction, and various transactions associated with the interaction, as well as information about participants in these interactions. As such, interaction module 522 and/or request data aggregation module 524 may receive and package the relevant information from these databases into a request. Request data aggregation module 524 may, additionally, combine or enhance the data stored within database system 502 with external data through external data aggregation module 542. External data aggregation module 542 may access one or more external data sources 508 to request and receive additional data related to a user, a third-party, an interaction, or other entity associated with an interaction. Examples of external data sources 508 may include public records (e.g., government records of names, addresses, and phone numbers, etc.), credit-related data sources, a similar user-entity's database, and/or the like. The external data aggregation module 542 may communicate with the external data sources 508 via any suitable method, including, for example, via API requests, screen scraping, electronic messages, and/or the like.

The information stored in database system 502 may be combined with the external data from data aggregation module 542 in user and third-party interaction module 522. Advantageously, user and third-party interaction module 522 may utilize information related to a user, a third-party, an interaction, and other information (e.g., any information obtained by the external data aggregation module 542 from the external data sources 508). Request data aggregation module 524 may then package, or aggregate, the various items of information, including information related to a user from user database 552, information related to a third-party from third-party database 554, information related to an interaction from interaction database 556, and external data obtained from external data aggregation module 542.

The aggregated data may then be passed to the request format generation module 526. The request format generation module 526 may format, or convert, the data into one or more formats suitable for transmission to third-parties. For example, third-party A 510a may require information transmitted to it to be in a particular binary format, and only comprise certain pieces of information or fields. Third-party N 510n may, conversely, require that information transmitted to it be in a hypertext format and contain certain different fields. Request format generation module 526 may accommodate these different structures and formats for each third-party by referring to format templates stored by the system and associated with each third-party. API interaction module 528 then receives the information, appropriately formatted for each third-party, from request format generation module 526, and transmits it to the various third-parties through their respective APIs. For example, API interaction module 528 may transmit the request as formatted for third-party A 510a through API A, to third-party A 510a. API interaction module 528 may iterate through all potential third-parties, eventually reaching third-party N 110n and accessing that third-party through API N 112n. In some implementations, the user and/or third-party may specify particular third-parties of interest, and to which the system may transmit the information. In various embodiments, different third-parties may be more appropriate than others for particular requests, and the system may determine using various user generated input particular third-party parties to provide the information to.

API interaction module 528 additionally receives responses from the various third-parties through their respective APIs. API interaction module 528 then forwards the received responses to response format standardization module 530, where the various third-parties structures and formats are converted into a common format (as described further below). Response aggregation module 532 gathers the standardized responses from the various third-parties and stores them in the various databases, including user database 552, third-party database 554, and/or interaction database 556, as appropriate. Additionally, response aggregation module 532 may determine particular responses that are to be passed to the interaction module 522 for display in a user interface. For example, as described below, the system may identify the most useful, or best, or a prioritized list of, responses to display to a user. The system may also, by the response aggregation module 532, determine that, for example, a threshold number of responses have not been received, and/or a quality of the responses does not meet a threshold. In such an instance, the system may determine not to present responses to the user.

As indicated in FIG. 5A, in an implementation the database system 502 (or one or more aspects of the database system 502) may comprise, or be implemented in, a "virtual computing environment". As used herein, the term "virtual computing environment" should be construed broadly to include, for example, computer readable program instructions executed by one or more processors (e.g., as described below in the example of FIG. 6) to implement one or more aspects of the modules and/or functionality described herein. Further, in this implementation, one or more modules (e.g., user and third-party interaction module 522, request data aggregation module 524, request format generation module 526, API interaction module 528, response format standardization module 530, response aggregation module 532, and/or external data aggregation module 542) of the database system 502 may be understood as comprising one or more rules engines of the virtual computing environment that, in response to inputs received by the virtual computing environment, execute rules and/or other program instructions to modify operation of the virtual computing environment. For example, a request received from the user computing device 504 may be understood as modifying operation of the virtual computing environment to cause the request data aggregation module 524 to gather data associated with the request, the request format generation module 526 to generate third-party requests with the appropriate formats and information, and the API interaction module 528 to transmit those requests to one or more APIs. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the request data aggregation module 524 and/or responses received and analyzed by the response aggregation module 532. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the database system 502 as a virtual computing environment may advantageously enable executing different aspects or modules of the system on different computing devices or processors, which may increase the scalability of the system. Implementing one or more aspects of the database system 502 as a virtual computing environment may further advantageously enable sandboxing various aspects, data, or modules of the system from one another, which may increase security of the system by preventing, e.g., malicious intrusion into the system from spreading. Implementing one or more aspects of the database system 502 as a virtual computing environment may further advantageously enable parallel execution of various aspects or modules of the system, which may increase the scalability of the system. Implementing one or more aspects of the database system 502 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

FIG. 5B is an illustration of example API request data generation, according to various embodiments of the present disclosure. As described above and below, in some implementations the request format generation module 526 may receive data associated with requests to be sent to various third-parties. FIG. 5B illustrates an example of such request data 560. For example, request data may include any data gathered by the request data aggregation module 524, such as first name, last name, employer name, employment status, etc. The request format generation module 526 may access API templates associated with the third-party to which requests are to be sent. Examples of such templates include API A format template 562, and API B format template 564. As shown in the example, the format templates may differ with respect to the organization of data, the type of data, specific data items, format of the data, and/or in any other respect. The system may determine such templates automatically by requesting such information from the third-parties, and/or the system may be provided the template information from other sources. The system, e.g., via the request format generation module 526, may then convert the request data 560 into formatted API requests (e.g., API A request 566 and API B request 568) based on the format templates. The requests may then be sent to the third-parties, e.g., via the API interaction module 568.

FIG. 5C is an illustration of example data standardization, according to various embodiments of the present disclosure. As described above and below, in some implementations the response format standardization module 530 may receive data associated with responses from various third-parties. FIG. 5C illustrates example of such response data (e.g., API A response data 570 and API B response data 572). As shown, the response data from different third-parties may differ with respect to the organization of data, the type of data, specific data items, format of the data, and/or in any other respect. For example, API A response data 570 includes "weekly value" as a first data item, while API B response data 572 includes "monthly value" as a second data item (e.g., the analogous data items from the two third-parties are provided in a different arrangement, and based on different time frames). The system, e.g., via the response format standardization module 530, may access a common format 574 to which every response is to be converted or standardized. An example common format 574 is shown in FIG. 5C, wherein the data is to include a third-party name first, and a bi-weekly value second. The system, e.g., via the response format standardization module 530, may, based on the common format, generate standardized API responses (e.g., standardized API A response 576 and standardized API response 578) for each of the received API responses. Such generation may include, for example, recalculation of values (e.g., converting to a common time frame, such as bi-weekly, from differing time frames). The standardized responses may then, e.g., be provided to response aggregation module 532.

With reference to FIGS. 5B and 5C, the data items, templates, formats, responses, requests, etc. are provided for illustrative purposes, and in various embodiments the system may implement any number of variations on the examples shown. In various embodiments, outgoing requests and/or incoming responses may be communicated in any suitable formats. For example, XML, JSON, and/or any other suitable formats may be used for API requests and responses. In some implementations, the system may advantageously, as described above, convert data from one format to another (e.g., based on templates) to enable communications with multiple third-parties and API. Such implementations may be particularly advantageous as the system is enabled to scale and communicate via ever more disparate API's over time, and be easily adapted to changes in existing API's as needed.

Additionally, in some implementations communications with one or more API's may be encrypted and/or authenticated. For example, public and/or private key exchanges may take place to establish authenticated and/or encrypted communications between, e.g., the system and computing systems of third-parties, to, e.g., protect user data from exposure to potentially malicious actors.

Notification Module

In some embodiments, an alert and/or notification can automatically be transmitted to a user device based on interactions with the interactive interpreter system. For example, if a particular user runs code or performs any particular action that would be relevant for another user, an alert and/or notification can be generated. The alert and/or notification can be transmitted at the time that the alert and/or notification is generated or at some determined time after generation of the alert and/or notification. When received by the user device, the alert and/or notification can cause the device to display the alert and/or notification via the activation of an application on the device (e.g., a browser, a mobile application, etc.). For example, receipt of the alert and/or notification may automatically activate an application on the user device, such as a messaging application (e.g., SMS or MMS messaging application), a standalone application (e.g., a data analysis application), or a browser, for example, and display information included in the alert and/or notification. If the user device is offline when the alert and/or notification is transmitted, the application may be automatically activated when the user device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Access Control

As described herein, preconfigured user access restrictions and/or access control lists can be used for data sets, user generated instructions, blocks, and/or services according to some embodiments of the present disclosure. In some embodiments, the interactive interpreter system 402 uses access control lists to allow a user to specify which other users and/or teams are permitted to view data sets, user generated instructions, blocks, and/or services. Additionally or alternatively, access control lists may further specify the permissions of particular users to view and/or modify data sets, user generated instructions, blocks, and/or services. In some embodiments, an access control list can be stored in a data store and/or data source of the interactive interpreter system 402 uses. An access control list can include one or more access control items and zero or more classifications. Thus, an access control list of the interactive interpreter system 402 can provide a level of granularity to specify sharing rules and/or permissions on a per-data item, block, or service basis. For example, during the creation and/or editing of a block, a user may specify a group corresponding to the one or more blocks. The users belonging to that group may view the search results and/or edit the data sets, user generated instructions, blocks, and/or services. An access control item can be associated with an a data set, user generated instructions, one or more blocks, and/or a service.

An access control item can include a group and a permission. A group can identify a set of users and/or teams. A permission can identify an operation that a user in the set can perform on the data set, user generated instructions, one or more blocks, and/or a service. Additionally or alternatively, a permission can further identify an operation the user in the set can perform on the access control list. Non-limiting examples of permissions include read, write, owner, create, delete, read only, and/or some combination thereof.

In some embodiments, if the access control list has a classification, then a user must be authorized for the classification. Thus, the classification may override the permission granted to the entity and/or user. For example, one possible set of classification markings as part of classification 330 include "Top Secret," "Secret," "Confidential," "Restricted," "For Official Use Only," among others, while another example classification scheme may use the markings: "Public" and "Restricted," among others. For example, the permissions of an access control list may indicate that a particular data object should not be shared with particular users.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, an element storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
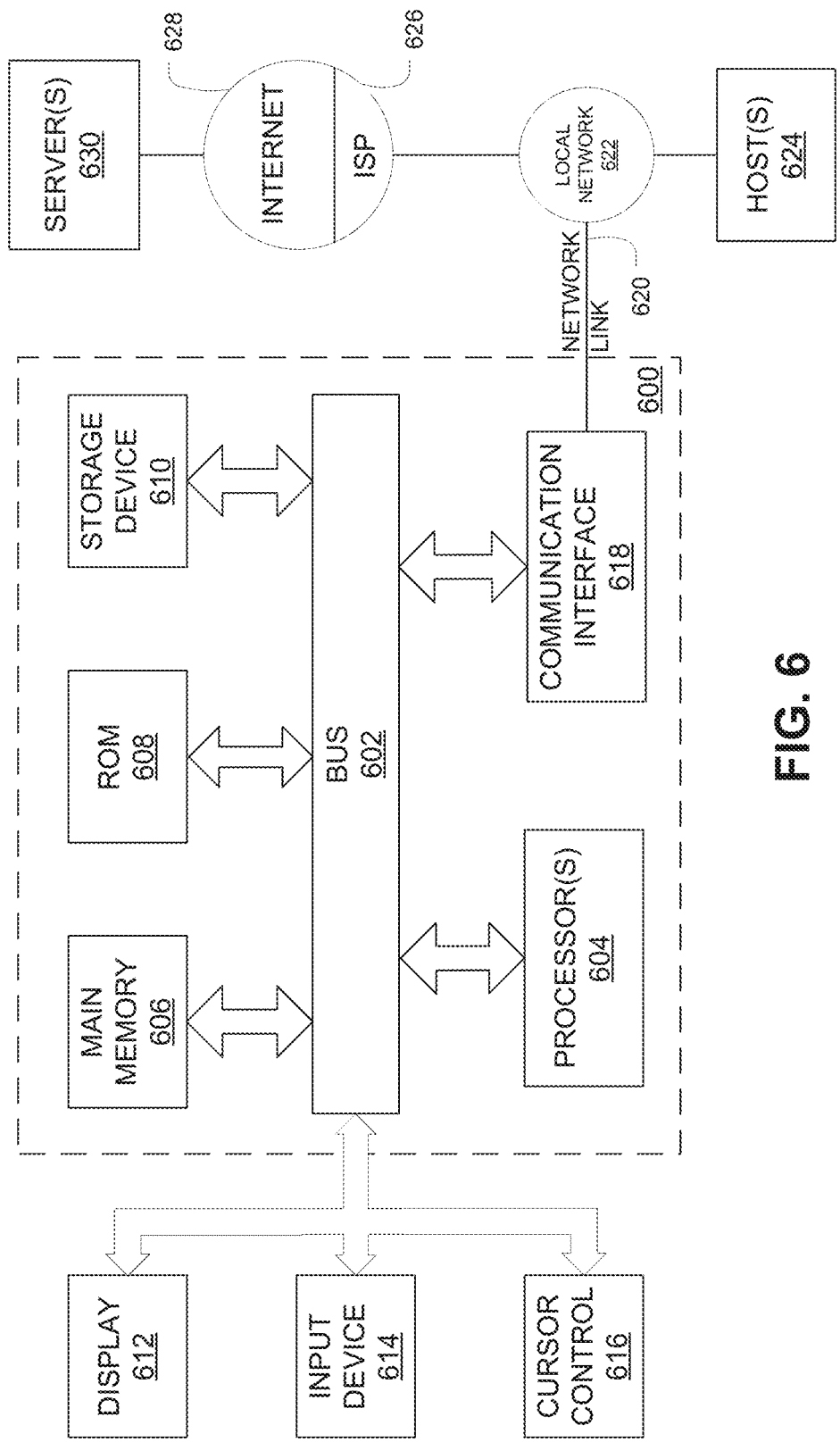
FIG. 6 illustrates a computer system with which certain methods discussed herein may be implemented.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "real time" or "near time" (either of which can be used in conjunction with "substantially") forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   one or more non-transitory computer storage mediums configured to at least store persisted user generated computer-executable instructions and computer-executable instructions; and
   one or more computer hardware processors in communication with the one or more non-transitory computer storage mediums, the one or more computer hardware processors configured to execute the computer-executable instructions to at least:
   receive, from a graphical user interface, first user generated computer-executable instructions comprising a resource identifier associated with a data set stored in a data pipeline;
   in response to receiving the first user generated computer-executable instructions, cause a first presentation of a first output comprising at least a portion of a data set associated with the resource identifier in the graphical user interface;
   in response to receiving second user generated computer-executable instructions that are different from the first user generated computer-executable instructions, generate a second output by performing a first operation on the data set;
   cause a second presentation in the graphical user interface of at least a portion of the second output, wherein the first output and the at least a portion of the second output are both presented in the graphical user interface, and wherein the graphical user interface presents the at least a portion of the second output differently than the first output;
   receiving, from the graphical user interface, a service publication request; and
   in response to receiving the service publication request, publish the first user generated computer-executable instructions and the second user generated computer-executable instructions as a first service, wherein an indication of the first service is configured to be shared or transmitted to one or more computing systems for execution of the first service.

2. The system of claim 1, wherein the one or more computer hardware processors are further configured to:
   execute the sharable first service to dynamically access and process data.

3. The system of claim 2, wherein the one or more computer hardware processors are further configured to:
   in response to executing the sharable first service, generate an updated output by:

accessing, from the data pipeline system, an updated data set associated with the resource identifier and based at least in part on the first user generated computer-executable instructions and the second user generated computer-executable instructions; and performing the first operation on the updated data set.

4. The system of claim 1, wherein the first user generated computer-executable instructions is stored as a first block and the second user generated computer-executable instructions is stored as a second block.

5. The system of claim 1, wherein at least one of the first user generated computer-executable instructions or the second user generated computer-executable instructions are accessible by a plurality of users.

6. The system of claim 1, wherein at least one of the first user generated computer-executable instructions or the second user generated computer-executable instructions are accessible by one or more users based at least in part on preconfigured user access restrictions.

7. The system of claim 1, wherein the one or more computer hardware processors are further configured to:
   assign a reference variable to the second output;
   receive third user generated computer-executable instructions comprising the reference variable; and
   in response to receiving the third user generated computer-executable instructions, apply the third user generated computer-executable instructions to:
      determine a second operation;
      perform the second operation on the second output identified by the reference variable;
      generate a third output from the second operation; and
      cause presentation, in the graphical user interface, of at least a portion of the third output, wherein the graphical user interface presents the at least a portion of the third output differently than the at least a portion of the second output.

8. The system of claim 1, wherein the first service is configured to include computer-executable instructions that, when executed, the first service executes both the first user generated computer-executable instructions and the second user generated computer-executable instructions.

9. The system of claim 1, wherein the data pipeline system is configured to perform data transformations to generate a plurality of data sets.

10. A method comprising:
    receiving, from a graphical user interface, first user generated computer-executable instructions comprising a resource identifier associated with a data set stored in a data pipeline;
    in response to receiving the first user generated computer-executable instructions, cause a first presentation of a first output comprising at least a portion of a data set associated with the resource identifier in the graphical user interface;
    receiving, from the graphical user interface, second user generated computer-executable instructions that are different from the first user generated computer-executable instructions;
    in response to receiving the second user generated computer-executable instructions, generating a second output by performing a first operation on the data set;
    causing a second presentation in the graphical user interface and at least a portion of the second output, wherein the graphical user interface presents the at least a portion of the second output differently than the first output;
    receiving, from the graphical user interface, a service publication request; and
    in response to receiving the service publication request, publishing the first user generated computer-executable instructions and the second user generated computer-executable instructions as a first service, wherein an indication of the first service is configured to be shared or transmitted to one or more computing systems for execution of the first service.

11. The method of claim 10, further comprising:
    executing the first service to dynamically access and process data.

12. The method of claim 11, further comprising:
    in response to executing the first service, generating an updated output by:
       accessing an updated data set associated with the resource identifier and based at least in part on the first user generated computer-executable instructions and the second user generated computer-executable instructions; and
       performing the first operation on the updated data set.

13. The method of claim 10, wherein the first user generated computer-executable instructions is stored as a first block and the second user generated computer-executable instructions is stored as a second block.

14. The method of claim 10, wherein at least one of the first user generated computer-executable instructions or the second user generated computer-executable instructions are accessible by a plurality of users.

15. The method of claim 10, wherein at least one of the first user generated computer-executable instructions or the second user generated computer-executable instructions are accessible by one or more users based at least in part on preconfigured user access restrictions.

16. The method of claim 10, further comprising:
    assigning a reference variable to the second output; and
    in response to receiving a third user generated computer-executable instructions comprising the reference variable, applying the third user generated computer-executable instructions to:
       determine a second operation;
       perform the second operation on the second output identified by the reference variable;
       generate a third output from the second operation; and
       cause presentation, in the graphical user interface, of at least a portion of the third output, wherein the graphical user interface presents the at least a portion of the third output differently than the at least a portion of the second output.

17. The method of claim 10, wherein the first service is configured to include computer-executable instructions that, when executed, the first service executes both the first user generated computer-executable instructions and the second user generated computer-executable instructions.

18. The method of claim 10, wherein the data pipeline system is configured to perform data transformations to generate a plurality of data sets.

* * * * *

UNITED STATES PATENT AND TRADEMARK OFFICE
CERTIFICATE OF CORRECTION

PATENT NO. : 11,669,517 B2
APPLICATION NO. : 17/116174
DATED : June 6, 2023
INVENTOR(S) : Antoine Llorca et al.

Page 1 of 1

It is certified that error appears in the above-identified patent and that said Letters Patent is hereby corrected as shown below:

In the Specification

Column 11, Line 10, delete "area." and insert -- area). --.

Column 36, Line 55, delete "program)." and insert -- program. --.

Column 25, Line 39, delete "an a" and insert -- a --.

Column 31, Line 38, delete "an a" and insert -- a --.

In the Claims

Column 38, Line 62, Claim 2, before "first" delete "sharable".

Column 38, Line 66, Claim 3, before "first" delete "sharable".

Signed and Sealed this
Twenty-second Day of August, 2023

Katherine Kelly Vidal
*Director of the United States Patent and Trademark Office*